United States Patent [19]

Matsumoto et al.

[11] Patent Number: 5,537,639
[45] Date of Patent: Jul. 16, 1996

[54] METHOD OF COMMUNICATING BETWEEN CPUS WITHIN A COPYING MACHINE WITH TRANSMITTING AND RECEIVING BUFFERS DIVIDED INTO CONTROL FLAG AREA AND DATA AREA

[75] Inventors: Masashi Matsumoto, Higashiosaka; Masaya Fujimoto, Kobe, both of Japan

[73] Assignee: Mita Industrial Co., Ltd., Osaka, Japan

[21] Appl. No.: 523,905

[22] Filed: Sep. 6, 1995

Related U.S. Application Data

[63] Continuation of Ser. No. 845,143, Mar. 3, 1992, abandoned.

[30] Foreign Application Priority Data

Mar. 9, 1991 [JP] Japan .................. 3-069055

[51] Int. Cl.⁶ .................. G06F 13/00; G06F 13/38
[52] U.S. Cl. .................. 395/200.13; 395/828; 395/830; 395/829; 395/872; 364/DIG. 1; 364/ 238.6; 364/260; 364/DIG. 2; 364/939; 364/939.7; 364/942.79; 355/200

[58] Field of Search .................. 395/200.05, 200.01, 395/200.13, 829, 853, 872, 830, 828; 355/200

[56] References Cited

U.S. PATENT DOCUMENTS

| | | | |
|---|---|---|---|
| 4,414,620 | 11/1983 | Tsuchimoto et al. | 395/250 |
| 4,777,595 | 10/1988 | Strecher et al. | 395/200 |
| 5,016,050 | 5/1991 | Roehrs et al. | 355/208 |
| 5,136,718 | 8/1992 | Heydt | 395/800 |

*Primary Examiner*—Thomas C. Lee
*Assistant Examiner*—D. Dinh
*Attorney, Agent, or Firm*—Beveridge, DeGrandi, Weilacher & Young

[57] ABSTRACT

A region of a communication buffer is divided into a control flag area where a communication mode flag and the like are set and a data area where communication data are set. In communication, a communication mode flag is set in the control flag area while communication data used in the specified communication mode are set in the data area. Thus, the data area can be shared among a plurality of communication modes. As a result, a capacity of the communication buffer can be reduced and the required communication period can be shortened.

2 Claims, 5 Drawing Sheets

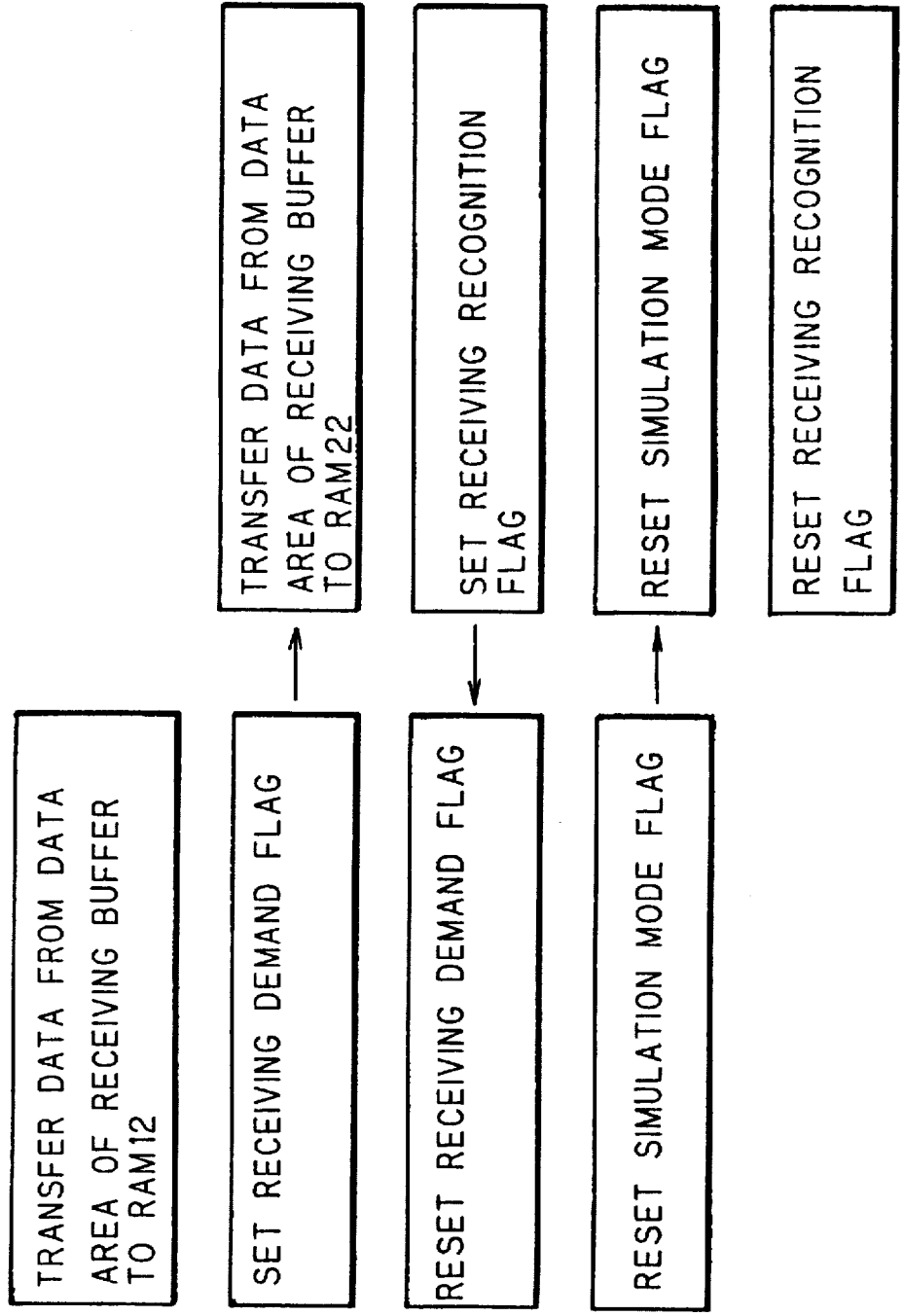

METHOD OF COMMUNICATING BETWEEN CPUS WITHIN A COPYING MACHINE WITH TRANSMITTING AND RECEIVING BUFFERS DIVIDED INTO CONTROL FLAG AREA AND DATA AREA

This application is a continuation of application Ser. No. 07/845,143, filed Mar. 3, 1992, which application is entirely incorporated herein by reference, now abandoned.

BACKGROUND OF THE INVENTION

1. Field of the Invention

The present invention relates to a method of communicating between CPUs in a digital copying machine.

2. Prior Art

In a digital copying machine, recently, as more headway is made in higher-speed processing and multifunctional operation, there has been a rising tendency toward the control of more than one CPUs. In such a copying machine, a communication buffer is generally used for communication between CPU.

Conventionally, with a plurality of communication modes, a communication data region in a communication buffer is determined for each communication mode, and therefore, there is the problem that a buffer having a relatively large capacity is required.

Additionally, in a communication method where new data are automatically transmitted when there is some change of data in a communication buffer, it is necessary for CPUs to retrieve all the regions of the communication buffer, and therefore, a required communication period becomes longer as the communication buffer has a larger capacity.

SUMMARY OF THE INVENTION

It is a general object of the present invention to provide a method of communication between CPUs, in which a capacity of a communication buffer can be reduced and the required communication period can be shortened. According to a first method of communication between CPUs in performing communication between CPUs for communicating a plurality of communication modes with a communication buffer, a region of the communication buffer is divided into two areas, a control flag area where communication mode flags and the like are set, and a data area where communication data are set in communication, a communication mode flag is set in the control flag area while communication data used in a specified communication mode are set in the data area, so that the data area can be shared among the communication modes.

The region of the communication buffer is divided into the control flag area where communication mode flags and the like are set and the data area where communication data are set. In communication, a communication mode flag is set in the control flag area while communication data used in a specified communication mode are set in the data area, so that the data area can be shared among the communication modes. Thus, the data area is shared among the communication modes. In this way, according to the first method of communication among CPUs, a capacity of the communication buffer can be reduced and a period for communication can be shortened.

The first method of communication among CPUs may, for example, be applied to a communication between an operating unit CPU for controlling an operating unit in a copying machine, and an image processing unit CPU for controlling an image processing unit. At least as a communication buffer for both the operating unit CPU and image processing unit CPU, a RAM backed up by a back-up power source, such as a battery and the like, may be used. The plurality of communication modes, for example, includes an initial mode communication performed in turning on the copying machine, an ordinary mode communication performed in a copying operation in the copying machine, and a simulation mode communication performed during maintenance of the copying machine.

A region of the communication buffer is divided into a transmission buffer area used for transmission and a receiving buffer area for receiving. The transmission buffer area and receiving buffer area may have their respective regions divided into a control flag area where communication mode flags and the like are set, and a data area where communication data are set.

According to a second method of communication between CPUs, in performing a communication between CPUs for communicating a plurality of communication modes with a communication buffer, a region of the communication buffer is divided into two areas, a transmission buffer area for transmission, and a receiving buffer area for receiving. During communication, a communication mode flag is set in the control flag area while communication data used in a specified communication mode are set in the data area, so that the data area can be shared among the communication modes. The transmission buffer area and receiving buffer area have their respective regions divided into a control flag area where communication mode flags and the like are set and a data area where communication data are set. In communication, a communication mode flag is set in the control flag area while communication data used in the specified communication mode are set in the data area so that the data area can be shared among the communication modes.

The region of the communication buffer is divided into a transmission buffer area for transmission and a receiving buffer area for receiving. The transmission buffer area and receiving buffer area have their respective regions divided into a control flag area where communication mode flags and the like are set and a data area where communication data are set. In communication, a communication mode flag is set in the control flag area while communication data used in the specified communication mode are set in the data area. Consequently, the data area is shared among the communication modes. Thus, according to the second method of communicating among CPUs, a capacity of the communication buffer can be reduced and the required communication period can be shortened.

BRIEF DESCRIPTION OF THE DRAWINGS

FIG. 5 is a diagram showing states of communication between the operating unit CPU and the image processing unit CPU when the operation goes off the simulation mode.

DETAILED DESCRIPTION OF THE PREFERRED EMBODIMENTS

Now, with reference to the drawings, preferred embodiments according to the present invention will be described.

Figure 1:
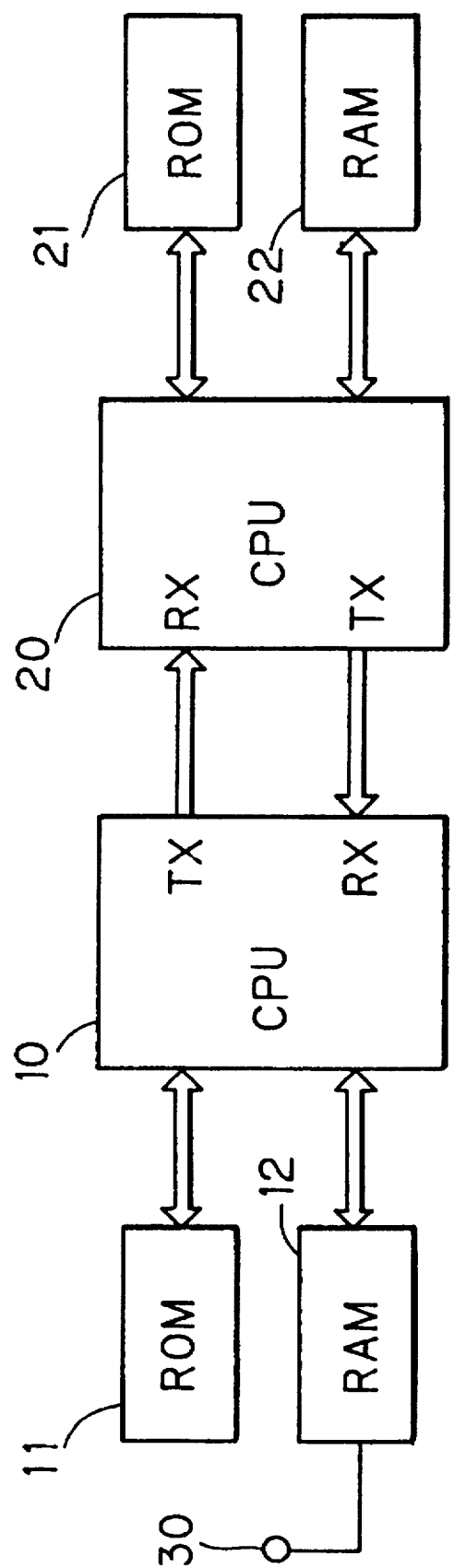
FIG. 1 is a block diagram showing an operating unit CPU and an image processing unit CPU in a digital copying machine.

FIG. 1 shows an operating unit CPU (Central Processing Unit) 10 provided in an operating unit in a digital copying machine and an image processing unit CPU 20 provided in an image processing unit. The operating unit CPU 10 and image processing unit CPU 20 include ROMs (Read Only Memories) 11 and 21 for storing programs for them and RAMs (Random Access Read/Write Memories) 12 and 22 for storing required data.

In the RAMs 12 and 22 of the operating unit CPU 10 and image processing unit CPU 20, the RAM 12 of the operating unit CPU 10 is backed up by a back-up power source 30, such as a battery and the like. The RAM 12 stores data for both the operating unit CPU 10 and image processing unit CPU 20 and backs up both. The reason why the RAM 12 of the operating unit CPU 10 alone is backed up, but the RAM 22 of the image processing unit CPU 20 is not, is to reduce a back-up power source requirement and consequently reduce the cost.

Figure 2:
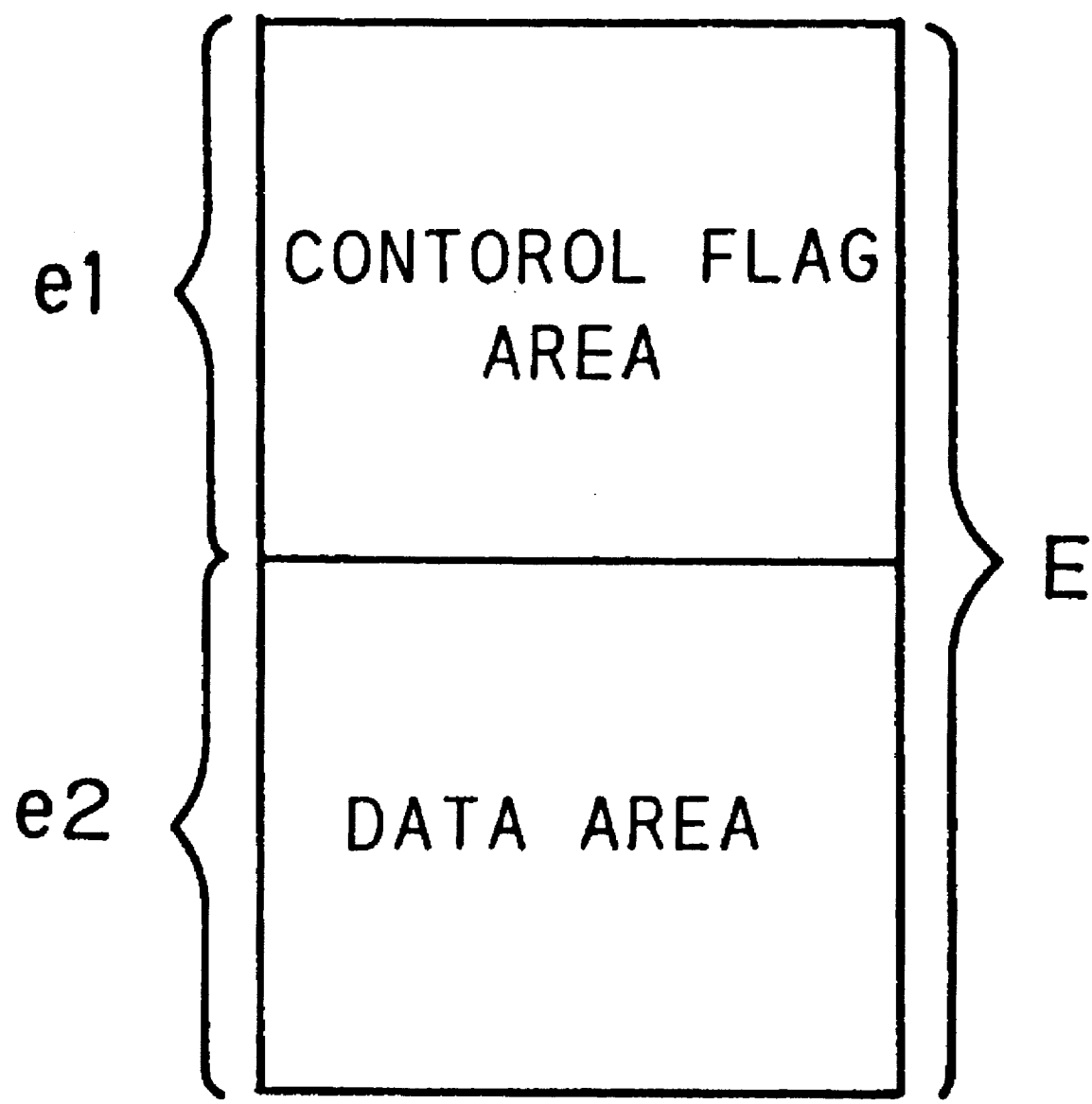
FIG. 2 is a diagram showing a communication buffer.

Within the respective RAMs 12 and 22 of the CPUs 10 and 20, a region used as a transmission buffer and a region used as a receiving buffer are provided. Either the transmission buffer region or the receiving buffer region has a capacity of 256 byte. A region E in each of the transmission buffer and receiving buffer is divided into a control flag area e1 and a data area e2, as shown in FIG. 2.

In such a digital copying machine, communication modes between the CPUs 10 and 20 include three modes: an initial mode, an ordinary mode and a simulation mode.

Initial mode communication is that which is performed when the machine is initially turned on, where the data needed to control the image processing unit CPU 20 in all the back-up data stored in the RAM 12 are transferred to the RAM 22 of the image processing unit CPU 20. The back-up data needed to control the image processing unit CPU 20 include, for example, the data for correcting variations of CCD element characteristic.

An ordinary mode communication is that which is performed in copying, where, for example, a variety of preset data, such as copying magnifications set in the operating unit, specified regions for trimming and masking processings, etc., are transmitted from the operating unit CPU 10 to the image processing unit CPU 20.

A simulation mode communication is, for example, that which is performed during maintenance by a service mechanic, where the data needed to perform simulations are transmitted between the operating unit CPU 10 and the image processing unit CPU 20, and the data desired to be displayed on a display device in the operating unit in a simulation are transmitted from the image processing unit CPU 20 to the operating unit CPU 10.

Figure 3:
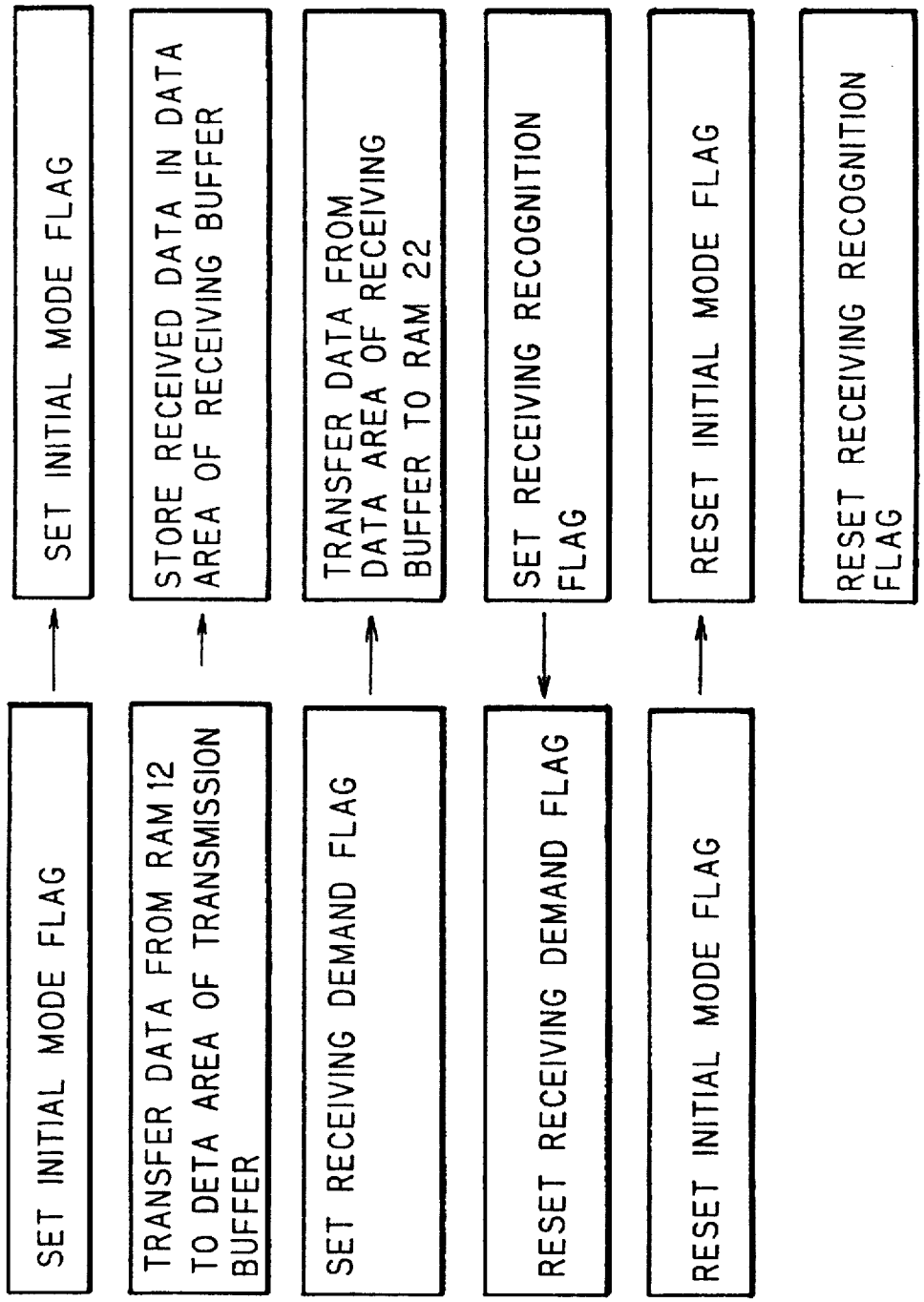
FIG. 3 is a diagram showing states of communication between the operating unit CPU and the image processing unit CPU in an initial mode.

FIG. 3 shows states of transmission between the operating unit CPU 10 and the image processing unit CPU 20 in the initial mode.

When the copying machine is turned on, the operating unit CPU 10 sets an initial mode flag in the control flag area in the transmission buffer. This allows data of the initial mode to be transmitted to the image processing unit CPU 20 and also allows the initial mode flag to be set in the control flag area in the receiving buffer in the image processing unit CPU 20. The image processing unit CPU 20 receives the data of the initial mode to prepare the data area of the receiving buffer for the data area of the initial mode, and stands by for the data transmitted thereto.

After transmitting the data of the initial mode, the operating unit CPU 10 set in the data area of the transmission buffer specified back-up data which are within the RAM 12, and it sets a receiving demand flag in the control flag area in the transmission buffer when all of the specified back-up data are set in the data area.

As the back-up data are set in the data area of the transmission buffer, the data are sequentially transmitted to the image processing unit CPU 20 and stored in the data area within the receiving buffer of the image processing unit CPU 20.

When the image processing unit CPU 20 receives the data of receiving demand after all of the transmission data are stored in the data area within the receiving buffer, the image processing unit CPU 20 transfers the received data stored in the data area within the receiving buffer to a specified area of the RAM 22. Then, after all of the received data are completely transferred, a receiving recognition flag is set in the control flag area within the transmission buffer.

In this way, the data of the receiving recognition are transmitted to the operating unit CPU 10. Receiving the data of receiving recognition, the operating unit CPU 10 resets the receiving demand flag in the control flag area within the transmission buffer and resets the initial mode flag.

When the initial mode flag in the control flag area within the transmission buffer of the operating unit CPU 10 is reset, the data indicating so is transmitted to the image processing unit CPU 20 causing the initial mode flag set in the control flag area within the receiving buffer of the image processing unit CPU 20 to be reset and the receiving recognition flag set in the control flag area within the transmission buffer to be reset. In this way, the initial mode communication is completed, and the communication mode is switched to the ordinary mode communication.

Figure 4:
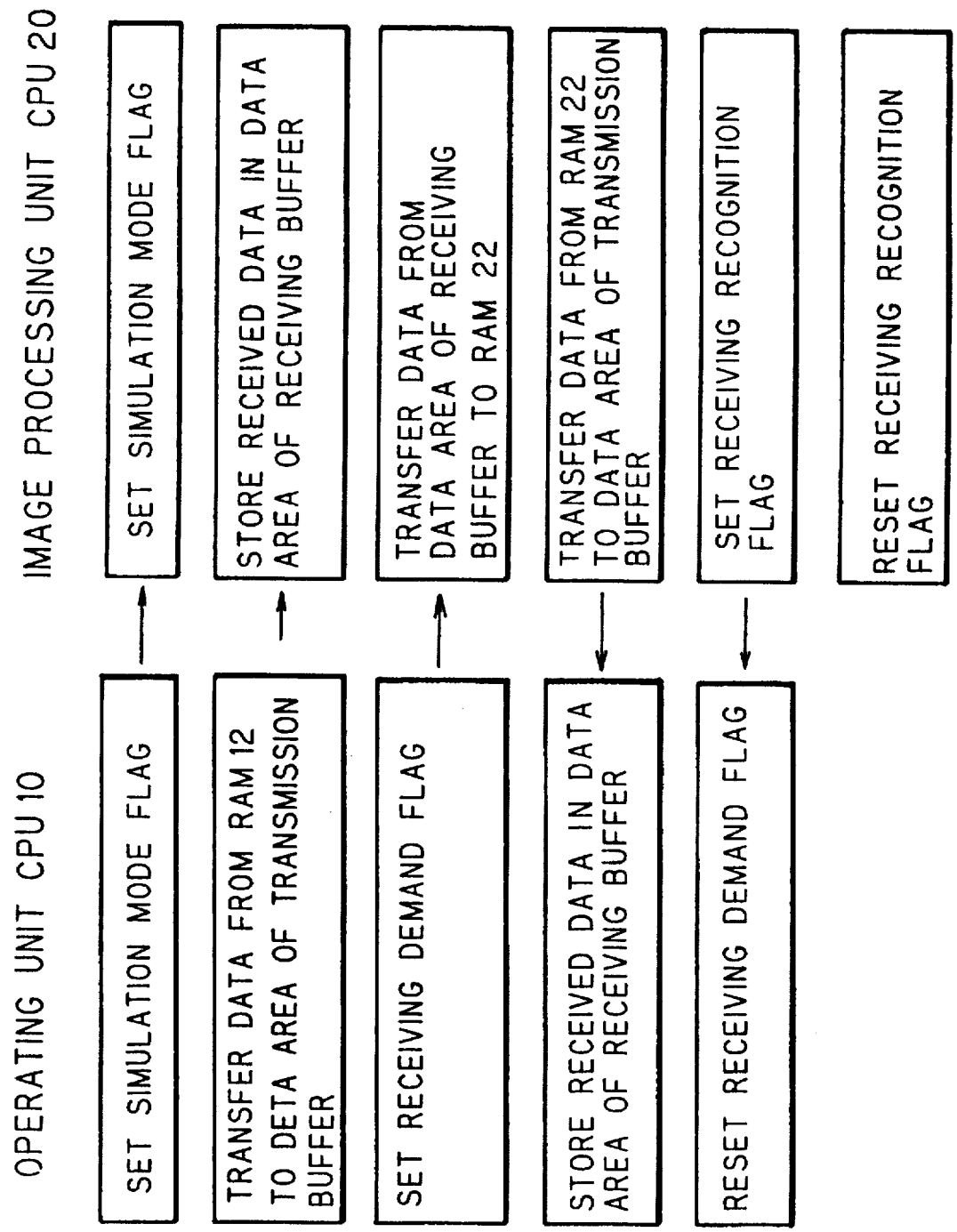
FIG. 4 is a diagram showing states of communication between the operating unit CPU and the image processing unit CPU when the operation goes in a simulation mode.

FIG. 4 shows states of communication between the operating unit CPU 10 and the image processing unit CPU 20 when the operation goes into the simulation mode.

When the service mechanic selects the simulation mode, the operating unit CPU 10 sets a simulation mode flag in the control flag area within the transmission buffer. In this way, the data of the simulation mode is transmitted to the image processing unit CPU 20, and the simulation mode flag is set in the control flag area within the receiving buffer of the image processing unit CPU 20. The image processing unit CPU 20 receives the data of simulation mode to prepare the data area of the receiving buffer for the data area of the simulation mode, and stands by for the data transmitted thereto.

After transmitting the data of simulation mode, the operating unit CPU 10 sets in the data area of the transmission buffer specified data in the RAM 12 which are needed to perform a simulation, and it sets the receiving demand flag in the control flag area within the transmission buffer when all of the specified data are set in the data area.

As the specified data needed to perform a simulation are set in the data area of the transmission buffer, the data are sequentially transmitted to the image processing unit CPU 20 and stored in the data area within the receiving buffer of the image processing unit CPU 20.

Then, when the image processing unit CPU 20 receives the receiving demand after all of the transmission data is stored in the data area within the receiving buffer, the image processing unit CPU 20 transfers the received data stored in the data area within the receiving buffer to a specified area of the RAM 22. Additionally, the data to be displayed in simulation and the like in all the data stored in the specified area of the RAM 22 are transferred to the data area within the transmission buffer. Then, after the transmission of all the data to the transmission buffer is completed, the receiving recognition flag is set in the control flag area within the transmission buffer. The receiving recognition flag is reset a specified period thereafter.

As the data to be displayed in simulation and the like are set in the data area of the transmission buffer, the data are sequentially transmitted to the operating unit CPU 10 and stored in the data area within the receiving buffer of the operating unit CPU 10. Then, when receiving the data of receiving recognition after all the transmitted data is stored in the data area within the receiving buffer, the operating unit CPU 10 resets the receiving demand flag in the control flag area within the transmission buffer. After that, a specified data communication is performed during an execution of the simulation.

FIG. 5 shows states of communication between the operating unit CPU 10 and the image processing unit CPU 20 when the operation goes off the simulation mode.

When a service mechanic applies an input to complete the simulation mode, the operating unit CPU 10 transfers, for example, the correcting data and the like obtained through the simulation to a specified area of the RAM 12. After that, the receiving demand flag is set in the control flag area within the transmission buffer.

When receiving the data of receiving demand, the image processing unit CPU 20 transfers the data stored in the data area within the receiving buffer to a specified area of the RAM 22. After that, a receiving recognition flag is set in the control flag area within the transmission buffer.

When the operating unit CPU 10 receives the data of receiving recognition, the receiving demand flag in the control flag area within the transmission buffer is reset and the simulation mode flag is also reset. When the simulation mode flag is reset in the control flag area within the transmission buffer is reset, the data showing it is transmitted to the image processing unit CPU 20, so that the simulation mode flag set in the control flag area within the receiving buffer of the image processing unit CPU 20 is reset and the receiving recognition flag set in the control flag area within the transmission buffer is reset. In this way, the simulation mode communication is completed, and the communication mode is switched into the ordinary mode communication.

The communication between the operating unit CPU 10 and the image processing unit CPU 20 in the ordinary mode is almost the same as the communication between the operating unit CPU 10 and the image processing unit CPU 20 in the initial mode except that the transmitted data are different, and therefore, explanation is omitted.

What is claimed is:

1. A method of communication in a copying machine between CPUs for communicating in a plurality of communication modes between an operating unit CPU having a first RAM, and an image forming unit CPU having a second RAM, each of said first and second RAMs having a single communication buffer, both of said CPUs being provided in said copying machine said method comprising the steps of:

defining said plurality of communication modes as an initial mode communication which is performed When power is initially supplied to said copying machine, a normal mode communication which is performed when the copying machine performs a copying operation, and a simulation mode communication which is performed when the copying machine is undergoing maintenance, sharing said single communication buffer of each RAM among communications in each of said communication modes, dividing an area of each of said communication buffers into a transmission buffer area for use in transmission and a receiving buffer area for use in receiving, dividing each of said transmission buffer area and said receiving buffer area into a control flag area where communication mode flags are set and a data area where communication data are stored, during a specified communication mode, setting communication mode flags in said control flag area while communication data used in the specified communication mode are stored in said data area such that the data area is accessible in all communication modes, as data in said transmission buffer area in said communication buffer of one of said CPUs are varied, sequentially transmitting said varying data to the other of said CPUs, whereby newly-set communication mode flags in said control flag area for said one of said CPUs and newly-stored communication data in said data area for said one of said CPUs are automatically transmitted to said other of said CPUs.

2. The method of communication between CPUs according to claim 1, further comprising the steps of:

backing up one of said first RAM and said second RAM with a back-up power source to provide a backed-up RAM, selecting an initial mode communication wherein data for initializing the CPU which does not have said backed-up RAM are stored in the RAM which is backed-up, and supplying power to said copying machine whereby the CPU comprising the RAM which is not backed-up is initialized.

* * * * *